(12) United States Patent
Aoyama et al.

(10) Patent No.: US 10,734,163 B2
(45) Date of Patent: Aug. 4, 2020

(54) ELECTROLYTIC CAPACITOR AND MANUFACTURING METHOD THEREFOR

(71) Applicant: Panasonic Intellectual Property Management Co., Ltd., Osaka (JP)

(72) Inventors: Tatsuji Aoyama, Kyoto (JP); Tomoyuki Tashiro, Yamaguchi (JP); Yukiya Shimoyama, Yamaguchi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/124,416

(22) Filed: Sep. 7, 2018

(65) Prior Publication Data

US 2019/0006112 A1    Jan. 3, 2019

Related U.S. Application Data

(63) Continuation of application No. PCT/JP2017/006466, filed on Feb. 22, 2017.

(30) Foreign Application Priority Data

Mar. 25, 2016   (JP) ................................ 2016-062423

(51) Int. Cl.
    *H01G 9/04*  (2006.01)
    *H01G 9/15*  (2006.01)
    (Continued)

(52) U.S. Cl.
    CPC ............. *H01G 9/04* (2013.01); *H01G 9/0029* (2013.01); *H01G 9/0032* (2013.01);
    (Continued)

(58) Field of Classification Search
    CPC ...... H01G 9/04; H01G 9/0029; H01G 9/0032; H01G 9/028; H01G 9/035; H01G 9/0425;
    (Continued)

(56) References Cited

U.S. PATENT DOCUMENTS

| 5,469,325 A | * | 11/1995 | Evans | ...................... H01G 9/00 |
| | | | | 361/517 |
| 7,224,575 B2 | * | 5/2007 | Sherwood | ............ H01G 9/0032 |
| | | | | 361/508 |

(Continued)

FOREIGN PATENT DOCUMENTS

| JP | 11-054380 | 2/1999 |
| JP | 2000-173864 | 6/2000 |
| WO | 2014/163204 | 10/2014 |

OTHER PUBLICATIONS

International Search Report of PCT application No. PCT/JP2017/006466 dated May 16, 2017.

*Primary Examiner* — Dion Ferguson
(74) *Attorney, Agent, or Firm* — McDermott Will & Emery LLP (57) ABSTRACT

An electrolytic capacitor includes a cathode foil, an anode foil, a conductive polymer, and a liquid component. The anode foil has a dielectric layer on a main surface of the anode foil. The conductive polymer covers at least part of the dielectric layer. The conductive polymer is disposed between the cathode foil and the anode foil. The liquid component is in contact with the conductive polymer. The cathode foil includes a first oxide coating film on an end surface of the cathode foil.

3 Claims, 2 Drawing Sheets

(51) Int. Cl.
*H01G 9/035* (2006.01)
*H01G 9/028* (2006.01)
*H01G 9/07* (2006.01)
*H01G 9/00* (2006.01)
*H01G 9/055* (2006.01)
*H01G 9/042* (2006.01)
*H01G 9/145* (2006.01)
*H01G 9/10* (2006.01)

(52) U.S. Cl.
CPC ............ *H01G 9/028* (2013.01); *H01G 9/035* (2013.01); *H01G 9/0425* (2013.01); *H01G 9/055* (2013.01); *H01G 9/07* (2013.01); *H01G 9/145* (2013.01); *H01G 9/151* (2013.01); *H01G 9/10* (2013.01)

(58) Field of Classification Search
CPC .......... H01G 9/055; H01G 9/07; H01G 9/145; H01G 9/151; H01G 9/10
See application file for complete search history.

(56) References Cited

U.S. PATENT DOCUMENTS

| | | | |
|---|---|---|---|
| 8,279,585 B2* | 10/2012 | Dreissig | H01G 9/0032 205/200 |
| 8,405,956 B2* | 3/2013 | Dreissig | H01G 9/035 361/503 |
| 8,543,201 B2* | 9/2013 | O'Phelan | A61N 1/375 607/5 |
| 9,384,901 B2* | 7/2016 | Weaver | H01G 9/008 |
| 9,972,442 B2* | 5/2018 | Weaver | H01G 9/008 |
| 2004/0258988 A1* | 12/2004 | Nielsen | H01G 9/10 429/181 |
| 2010/0053847 A1* | 3/2010 | Tani | H01G 9/035 361/505 |
| 2012/0300368 A1* | 11/2012 | Matsuura | H01G 9/035 361/506 |
| 2015/0213962 A1* | 7/2015 | Koseki | H01G 9/028 361/527 |
| 2015/0287540 A1* | 10/2015 | Koseki | H01G 9/028 361/506 |
| 2016/0035495 A1 | 2/2016 | Komatsu et al. | |

* cited by examiner

ELECTROLYTIC CAPACITOR AND MANUFACTURING METHOD THEREFOR

RELATED APPLICATIONS

This application is a continuation of the PCT International Application No. PCT/JP2017/006466 filed on Feb. 22, 2017, which claims the benefit of foreign priority of Japanese patent application No. 2016-062423 filed on Mar. 25, 2016, the contents all of which are incorporated herein by reference.

BACKGROUND

1. Technical Field

The present disclosure relates to an electrolytic capacitor that includes a capacitor element including a conductive polymer and a liquid component such as an electrolytic solution, the conductive polymer being attached to a portion between a cathode foil and an anode foil, and a method for manufacturing the electrolytic capacitor.

2. Description of the Related Art

A promising candidate as a capacitor having small size, large capacitance, and low ESR (Equivalent Series Resistance) is an electrolytic capacitor including a capacitor element and an electrolytic solution, the capacitor element having a wound body and a conductive polymer attached to the wound body, and the wound body being obtained by winding an anode foil having a dielectric layer, and a cathode foil.

In the electrolytic capacitor, the dielectric layer is formed on a surface of the anode foil by anodization, whereas the anodization for the cathode foil has been hardly considered.

Unexamined Japanese Patent Publication No. 11-54380 discloses assembling of a solid electrolytic capacitor including a solid electrolyte made from manganese dioxide, with use of an anode foil and a cathode foil that have undergone an anodizing treatment. The patent literature, however, does not disclose formation of an oxide coating film on an end surface of the cathode foil.

SUMMARY

An electrolytic capacitor according to a first aspect of the present disclosure includes a cathode foil, an anode foil, a conductive polymer, and a liquid component. The anode foil has a dielectric layer on a main surface of the anode foil. The conductive polymer covers, between the cathode foil and the anode foil, at least part of the dielectric layer. The liquid component is in contact with the conductive polymer. The cathode foil includes a first oxide coating film on an end surface of the cathode foil.

A method for manufacturing an electrolytic capacitor according to a second aspect of the present disclosure includes following first to fourth steps. In the first step, a wound body is included, the wound body including a cathode foil, an anode foil having a dielectric layer on a main surface of the anode foil, and a separator disposed between the cathode foil and the anode foil. In the second step, a conductive polymer is attached to the wound body so as to cover at least part of the dielectric layer, the conductive polymer being disposed between the cathode foil and the anode foil, and thus a capacitor element is formed. In the third step, impregnates the capacitor element is impregnated with a liquid component. In the fourth step, a first oxide coating film is formed on an end surface of the cathode foil before the attaching of the conductive polymer to the wound body.

According to exemplary embodiments of the present disclosure, it is possible to largely reduce the ESR and enhance an effect of increasing the capacitance in the electrolytic capacitor.

DETAILED DESCRIPTION OF EMBODIMENT

Conventional capacitors still leave room for improvement of reducing the ESR and increasing the capacitance. This is considered to be because a uniform film of the conductive polymer that sufficiently convers the dielectric layer has not been formed in attaching the conductive polymer to a portion between the cathode foil and the anode foil.

In view of the circumstances described above, the present disclosure provides an electrolytic capacitor that has reduced ESR and a high effect of increasing the capacitance, and a method for manufacturing the electrolytic capacitor.

An electrolytic capacitor according to an exemplary embodiment of the present disclosure includes a cathode foil, an anode foil, a conductive polymer, and a liquid component. The anode foil has a dielectric layer on a main surface of the anode foil. The conductive polymer is disposed between the cathode foil and the anode foil to cover at least part of the dielectric layer. The liquid component is in contact with the conductive polymer. The cathode foil includes an oxide coating film (first oxide coating film) on an end surface of the cathode foil.

A method for manufacturing an electrolytic capacitor according to an exemplary embodiment of the present disclosure includes following first to fourth steps. In the first step, a wound body is formed. The wound body includes a cathode foil, an anode foil having a dielectric layer on a main surface of the anode foil, and a separator disposed between the cathode foil and the anode foil. In the second step, a conductive polymer is attached to the wound body so as to cover at least part of the dielectric layer, and thus a capacitor element is formed. The conductive polymer is disposed between the cathode foil and the anode foil. In the third step, the capacitor element is impregnated with a liquid component. In the fourth step, an oxide coating film (first oxide coating film) is formed on an end surface of the cathode foil before the attaching of the conductive polymer to the wound body.

In the present exemplary embodiments, it has been found that the formation of the first oxide coating film on the end surface of the cathode foil is capable of improving the effect of reducing the ESR and enhancing the effect of increasing the capacitance. A reason for these improvement and enhancement is not clear but is considered because the formation of the first oxide coating film on the end surface of the cathode foil largely increases wettability of the cathode foil with respect to the conductive polymer (or a dispersion containing the conductive polymer) when the conductive polymer is applied to the anode foil and the cathode foil (or, for example, the wound body including these electrode foils). This enhances impregnating properties of the conductive polymer into a space between the anode foil and the cathode foil to facilitate the attachment of the conductive polymer. Thus formation of an appropriate coating film of the conductive polymer is facilitated. Accordingly, low ESR and the effect of increasing the capacitance are considered to be achieved. The enhancement of the impregnating properties of the conductive polymer also allows shortening of time for the application of the conductive polymer, so that it is possible to increase productivity of the electrolytic capacitor.

The electrolytic capacitor according to the present exemplary embodiment may also include an oxide coating film (second oxide coating film) on a main surface of the cathode foil. The oxide coating film is further formed on the main surface in addition to the end surface of the cathode foil so that the effect of reducing the ESR and the effect of increasing the capacitance are further enhanced. The formation of the oxide coating film on the main surface of the cathode foil also increases resistance to reverse voltage.

The first oxide coating film formed on the end surface of the cathode foil may have a thickness equal to a thickness of the second oxide coating film formed on the main surface of the cathode foil or may have a thickness larger than the thickness of the second oxide coating film. The first oxide coating film preferably has a thickness smaller than the thickness of the second oxide coating film, from a viewpoint of suppressing generation of unevenness on the second oxide coating film and increasing withstand voltage characteristics.

The first oxide coating film formed on the end surface of the cathode foil has a thickness ranging, for example, from 0.3 nm to 15 nm, inclusive, preferably from 0.5 nm to 10 nm, inclusive. The second oxide coating film formed on the main surface of the cathode foil has a thickness ranging, for example, from 1.0 nm to 20 nm, inclusive, preferably from 1.5 nm to 10 nm, inclusive.

The dielectric layer formed on the main surface of the anode foil (second dielectric layer described later) preferably has a thickness larger than the thickness of the second oxide coating film formed on the main surface of the cathode foil. This can facilitate easy securement of high withstand voltage characteristics and suppress a decrease of the capacitance.

The main surfaces of the cathode foil or the anode foil mean two surfaces each of which has largest area among the surfaces of the electrode foil. The end surfaces of the cathode foil or the anode foil mean surfaces other than the main surfaces of the electrode and exist at ends of the electrode. When a large electrode foil is cut, the end surfaces also include a cutting surface. End surfaces of the wound body are surfaces of the electrode foils that are provided as a top surface and a bottom surface other than a peripheral surface.

Hereinafter, the present exemplary embodiment is more specifically described with appropriate reference to the drawings. The exemplary embodiment described below, however, is not to limit the present disclosure.

Figure 1:
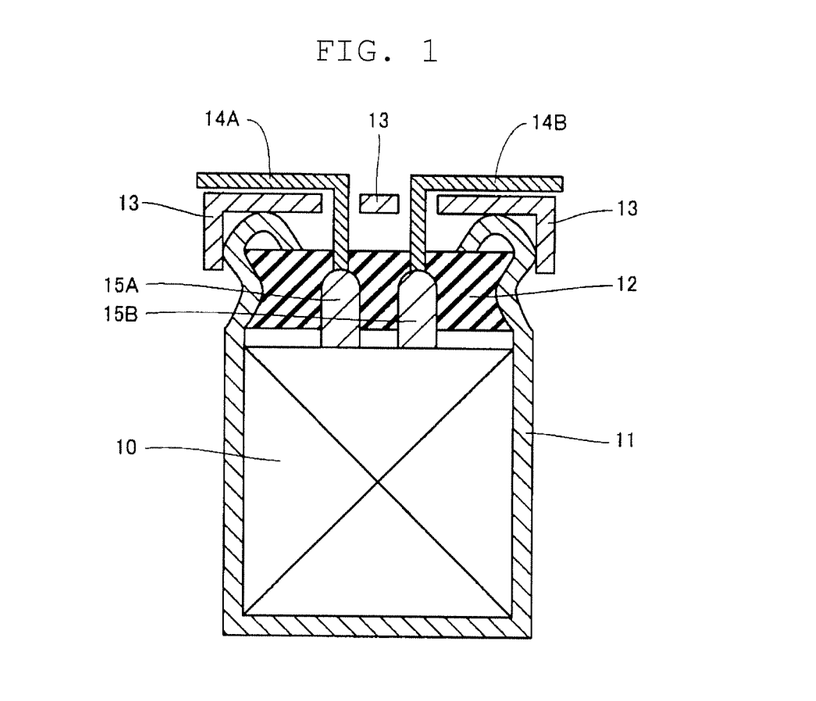
FIG. 1 is a schematic sectional view illustrating an electrolytic capacitor according to an exemplary embodiment of the present disclosure.
Figure 2:
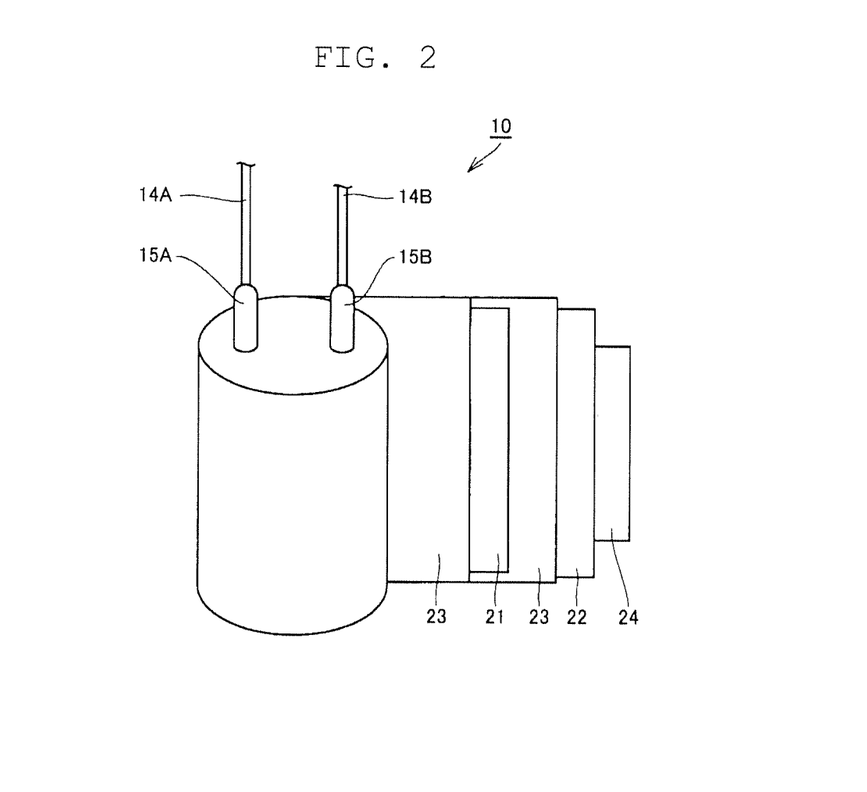
FIG. 2 is a schematic view for illustrating a configuration of a wound body included in the electrolytic capacitor in FIG. 1.
Figure 3:
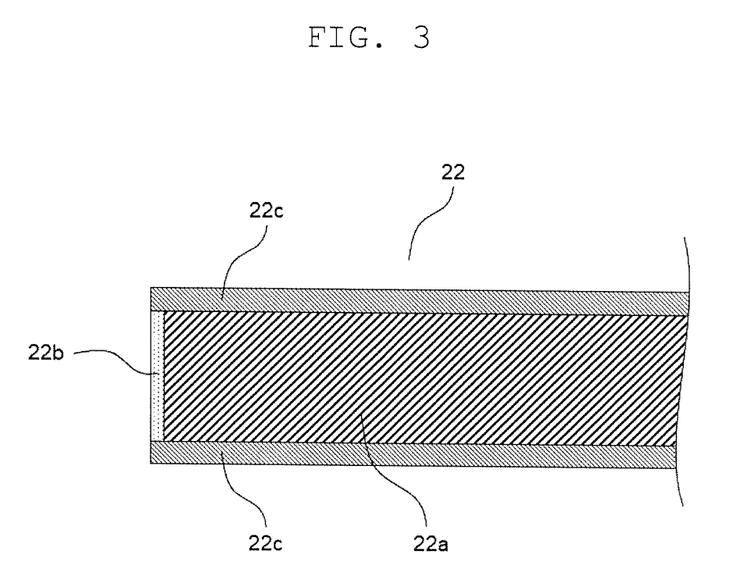
FIG. 3 is an enlarged schematic diagram in a vicinity of an end of a cathode foil in the electrolytic capacitor of the present disclosure.

FIG. 1 is a schematic sectional view illustrating the electrolytic capacitor according to the present exemplary embodiment, and FIG. 2 is a schematic view obtained by partially developing a wound body of the electrolytic capacitor. FIG. 3 is an enlarged schematic diagram in a vicinity of an end of a cathode foil in the electrolytic capacitor of the present disclosure.

The electrolytic capacitor includes, for example, capacitor element 10, bottomed case 11 that houses capacitor element 10, sealing member 12 that seals an opening of bottomed case 11, base plate 13 that covers sealing member 12, lead wires 14A, 14B that are lead out from sealing member 12 and penetrate base plate 13, lead tabs 15A, 15B that connect the lead wires 14A, 14B to electrodes of capacitor element 10, respectively, and a liquid component (not shown). Capacitor element 10 is housed in bottomed case 11 together with the liquid component. Bottomed case 11 is, at a part near an opening end, processed inward by drawing, and is, at the opening end, curled to swage sealing member 12.

Capacitor element 10 is produced by, for example, attaching a conductive polymer to a wound body shown in FIG. 2. The wound body includes anode foil 21 having a dielectric layer on at least a main surface of the anode foil, cathode foil 22, and separator 23 interposed between the anode foil and the cathode foil. The conductive polymer is disposed between anode foil 21 and cathode foil 22, and attached to anode foil 21 so as to cover at least part of a surface of the dielectric layer of the anode foil 21. Capacitor element 10 further includes lead tab 15A connected to anode foil 21 and lead tab 15B connected to cathode foil 22.

Anode foil 21 and cathode foil 22 are wound with separator 23 interposed between the anode foil and the cathode foil. An outermost periphery of the wound body is fixed with fastening tape 24. FIG. 2 shows the wound body that is partially developed before the outermost periphery of the wound body is fixed.

Anode foil 21 includes a metal foil whose surface is roughened to have projections and recesses, and the dielectric layer is formed on the metal foil having the projections and recesses. As shown in FIG. 3, cathode foil 22 includes metal foil 22a, and has first oxide coating film 22b formed on an end surface of the cathode foil. And cathode foil 22 may have second oxide coating film 22c formed on a main surface of the cathode foil 22.

Hereinafter, one example of the method for manufacturing an electrolytic capacitor according to the present exemplary embodiment is described in terms of the steps and the configuration of the electrolytic capacitor.

A cathode foil and an anode foil having a dielectric layer are each prepared prior to the step of forming a wound body. The dielectric layer can be formed by subjecting the anode foil to an anodizing treatment. The anodizing treatment for the anode foil is performed in the step of preparing the anode foil but may be performed after the wound body is formed or after a capacitor element is encapsulated. The step of forming an oxide coating film on the cathode foil (anodizing treatment) may be performed before the step of attaching a conductive polymer to the wound body. For example, the step of forming the oxide coating film on the cathode foil may be performed in the step of preparing the cathode foil or in the step of forming the wound body.

(i) Step of Preparing Anode Foil 21 Having Dielectric Layer

First, a metal foil as a raw material for anode foil 21 is prepared. A type of the metal is not particularly limited, but it is preferable to use a valve metal such as aluminum, tantalum, or niobium, or an alloy including a valve metal, from a viewpoint of facilitating the formation of a dielectric layer.

Next, a surface of the metal foil is roughened. By the roughening, a plurality of projections and recesses are formed on the surface of the metal foil. The roughening is preferably performed by etching the metal foil. The etching may be performed by, for example, a DC (direct current) electrolytic method or an AC (alternating current) electrolytic method.

Next, a dielectric layer is formed on the roughened surface of the metal foil. A method for forming the dielectric layer is not particularly limited, and the dielectric layer can be formed by subjecting the metal foil to an anodizing treatment. The anodizing treatment forms the dielectric layer on a main surface of the anode foil. At this time, the dielectric layer may also be formed on an end surface of the anode foil. In the present specification, the dielectric layer formed on the end surface of the anode foil is also referred to as a first dielectric layer and the dielectric layer formed on the main surface of the anode foil as a second dielectric layer.

The anodizing treatment can be performed with, for example, an anodizing treatment solution. The anodizing treatment can be performed by subjecting the metal foil to a heat treatment while immersing the metal foil in the anodizing treatment solution. Temperature during the anodizing treatment ranges, for example, from 50° C. to 85° C., inclusive. Alternatively, the anodizing treatment may be performed by applying a voltage to the metal foil while immersing the metal foil in the anodizing treatment solution. Both the heat treatment and the voltage application may be performed for the anodizing treatment.

Examples of the anodizing treatment solution include an aqueous solution containing a salt such as phosphate, adipate, or borate. Examples of the phosphate include an ammonium phosphate salt, a potassium phosphate salt, and a sodium phosphate salt. Examples of the ammonium phosphate salt include diammonium monohydrogen phosphate and monoammonium dihydrogen phosphate. As adipate and borate, there can also be exemplified an ammonium salt, a potassium salt, and a sodium salt. The anodizing treatment solution may contain one of these salts or two or more of these salts. It is preferable to use an ammonium phosphate aqueous solution such as a monoammonium dihydrogen phosphate aqueous solution, or an ammonium adipate aqueous solution, from a viewpoint of operability.

Normally, the roughening treatment and the anodizing treatment are performed on a main surface of a large foil of, for example, a valve metal (metal foil), from a viewpoint of mass productivity. In this case, the treated foil is cut into a desired size to prepare anode foil 21. Cut anode foil 21 has a dielectric layer (second dielectric layer) on a main surface of the anode foil.

The anode foil prepared by forming the second dielectric layer on the main surface of the anode foil and then cutting the anode foil at a predetermined width may be further subjected to a anodizing treatment to form a first dielectric layer on an end surface of the anode foil as necessary. In order to form the first dielectric layer, the anode foil cut at the predetermined width and wound (that is, with end surfaces of the anode foil provided as a top surface and a bottom surface of the wound body) may be subjected to a heat treatment and/or voltage application while immersed in an anodizing treatment solution. Alternatively, the anode foil that is cut at the predetermined width, to which a lead terminal is connected, and that is then wound may be subjected to a anodizing treatment. Heat treatment temperature can be appropriately selected from the above range. The anode foil that has undergone the anodizing treatment may be washed or dried as necessary.

(ii) Step of Preparing Cathode Foil 22

A metal foil can be used for cathode foil 22 as with anode foil 21. A type of the metal is not particularly limited, but it is preferable to use a valve metal such as aluminum, tantalum, or niobium, or an alloy including a valve metal. A surface of the metal foil may be roughened as necessary.

In this step, the metal foil may be subjected to an anodizing treatment to form an oxide coating film(s) (a first oxide coating film and/or a second oxide coating film) on the cathode foil. When the anodizing treatment is performed in this step, it is preferable to form the second oxide coating film on a main surface of the cathode foil. In this case, the first oxide coating film may also be formed on an end surface of the cathode foil.

The anodizing treatment can be performed with, for example, an anodizing treatment solution. The anodizing treatment can be performed by applying a plus voltage to the metal foil while immersing the metal foil in the anodizing treatment solution. At this time, the anodizing treatment may also be performed as necessary under a temperature condition ranging, for example, from 50° C. to 85° C., inclusive (preferably from 60° C. to 75° C., inclusive).

The anodizing treatment solution can be appropriately selected from those exemplified for the anodizing treatment for the anode foil. The voltage applied to the cathode foil during the anodizing treatment ranges, for example, from 1 V to 10V, preferably from 2 V to 5 V. The applied voltage within such a range facilitates the formation of the oxide coating films (particularly the second oxide coating film) with an appropriate thickness to give an advantage, from a viewpoint of increasing the capacity. Adjusting intensity of the applied voltage during the anodizing treatment enables the thickness of the oxide coating films (particularly the second oxide coating film) to be adjusted. Normally, a large foil of, for example, a valve metal (metal foil) is subjected to the roughening treatment and the anodizing treatment, from a viewpoint of mass productivity. In this case, the treated foil is cut into a desired size to prepare the cathode foil.

The cathode foil obtained by forming the second oxide coating film on the main surface of the cathode foil and then cutting the cathode foil at a predetermined width may be further subjected to an anodizing treatment to form the first oxide coating film on the end surface of the cathode foil. In order to form the first oxide coating film, the cathode foil cut at the predetermined width and wound (that is, with end surfaces of the cathode foil provided as a top surface and a bottom surface) may be subjected to voltage application while immersed in an anodizing treatment solution. The applied voltage and the temperature condition can be appropriately selected from the above ranges. Alternatively, the cathode foil that is cut at the predetermined width, to which a lead terminal is connected, and that is then wound may be subjected to a anodizing treatment. The cathode foil that has undergone the anodizing treatment may be washed or dried as necessary.

(iii) Step of Forming Wound Body

Next, a wound body is produced by using anode foil 21 and cathode foil 22. First, anode foil 21 and cathode foil 22 are wound with separator 23 interposed between the anode foil and the cathode foil. At this time, the winding can be conducted while lead tabs 15A, 15B are rolled in the anode foil, the cathode foil, and the separator, to cause lead tabs 15A, 15B to stand up from the wound body as shown in FIG. 2.

As a material for separator 23, a nonwoven fabric that includes, as a main component, for example, synthetic cellulose, polyethylene terephthalate, polybutylene terephthalate, polyphenylenesulfide, vinylon, nylon, aromatic polyamide, polyimide, polyamideimide, polyetherimide, rayon, or a vitreous material can be used.

A material for lead tabs 15A, 15B is not particularly limited as long as the material is a conductive material. A material for lead wires 14A, 14B connected to lead tabs 15A, 15B, respectively, is not also particularly limited as long as the material is a conductive material.

Next, fastening tape 24 is disposed on an outer surface of cathode foil 22 positioned at an outermost layer of wound anode foil 21, cathode foil 22, and separator 23, to fix an end of cathode foil 22 with fastening tape 24.

In this step, the wound body may be subjected to an anodizing treatment (re-anodizing treatment) to form at least part of the dielectric layer on the anode foil. The wound body may also be subjected to an anodizing treatment (re-anodizing treatment) to form at least part of the oxide coating film(s) (the first oxide coating film and/or the second oxide coating film) on the cathode foil.

Particularly, when anode foil 21 is prepared by cutting a large metal foil in step (i), the wound body is further subjected to an anodizing treatment (re-anodizing treatment) to form the dielectric layer (first dielectric layer) on the end surface of anode foil 21. The anodizing treatment at this time can also be performed with an anodizing treatment solution. The anodizing treatment may be performed by, for example, subjecting the wound body to a heat treatment while immersing the wound body in the anodizing treatment solution. Alternatively, the anodizing treatment may be performed by applying a plus voltage to the anode foil of the wound body with a third electrode set as an opposite electrode while immersing the wound body and the third electrode in the anodizing treatment solution. Both the heat treatment and the voltage application may be performed for the anodizing treatment. Conditions of the anodizing treatment can be appropriately determined from those described for step (i).

When the cathode foil is subjected to an anodizing treatment in this step, the anodizing treatment may be performed by, for example, applying a plus voltage to the cathode foil of the wound body with a third electrode set as an opposite electrode to oxidize a surface of the cathode foil, while immersing the wound body and the third electrode in an anodizing treatment solution The voltage applied to the cathode foil ranges, for example, from 0.2 V to 10V, preferably from 0.5 V to 5 V with respect to the third electrode. When the first oxide coating film is preferentially formed on the end surface(s) of the cathode foil, a voltage may be applied to the cathode foil while the third electrode is disposed opposite to the top surface and/or the bottom surface of the wound body. The anodizing treatment solution can be appropriately determined from those described for step (i) and temperature for the anodizing treatment can be appropriately determined from those described for step (ii).

When the first oxide coating film is preferentially formed, the applied voltage is set to less than or equal to the voltage during the formation of the second oxide coating film (specifically, during the formation of the second oxide coating film in step (ii)) to allow a gas as a side product to attach onto the second oxide coating film that has been already formed, so that it is possible to suppress generation of unevenness on the second oxide coating film. Accordingly, it is possible to suppress a decrease of the withstand voltage characteristics. In the meantime, a voltage may be applied to the cathode foil with the anode foil set as the opposite electrode, instead of using the third electrode.

The anodizing treatment may be performed while the whole of the wound body is immersed in the anodizing treatment solution or at least the top surface or the bottom surface of the wound body is immersed in the anodizing treatment solution. The anodization for the cathode foil performed by the latter method facilitates intense formation of the oxide coating film on the end surface of the cathode foil to give an advantage of increasing the thickness of the first oxide coating film. The wound body that has undergone the anodizing treatment is washed or dried as necessary.

(iv) Step of Attaching Conductive Polymer to Wound Body

In this step, a conductive polymer is attached to the wound body by applying a treatment solution containing the conductive polymer to the wound body. Between anode foil 21 and cathode foil 22, the conductive polymer may be filmily attached to a surface of the dielectric layer(s) (the first dielectric layer and/or the second dielectric layer) of anode foil 21 to form a conductive polymer layer (or a solid electrolyte layer). The attachment of the conductive polymer, however, is not limited to this example. The conductive polymer may also be attached to cover at least part of the first oxide coating film and/or the second oxide coating film of cathode foil 22. The conductive polymer may also cover at least part of a surface of separator 23.

The conductive polymer is preferably, for example, polypyrrole, polythiophene, or polyaniline. These conductive polymers may be used alone, or two or more of these conductive polymers may be used in combination, or a copolymer of two or more monomers may be used. A weight-average molecular weight of the conductive polymer is not particularly limited and ranges, for example, from 1000 to 100000, inclusive.

In the present specification, polypyrrole, polythiophene, polyaniline, and the like mean polymers having, as a basic skeleton, polypyrrole, polythiophene, polyaniline, and the like, respectively. Therefore, polypyrrole, polythiophene, polyaniline, and the like can also include derivatives of polypyrrole, polythiophene, polyaniline, and the like, respectively. For example, polythiophene includes poly(3, 4-ethylenedioxythiophene) (PEDOT) and the like.

A dopant may be added to the conductive polymer. It is desirable to use a polymer dopant, from a viewpoint of suppressing dedoping of the dopant from the conductive polymer. Examples of the polymer dopant include anions of polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. These polymer dopants may be used alone, or two or more of these dopants may be used in combination. These polymer dopants may be a homopolymer or a copolymer of two or more monomers. Particularly, polystyrenesulfonic acid (PSS) is preferable.

A weight-average molecular weight of the dopant is not particularly limited but preferably ranges, for example, from 1000 to 100000, inclusive, in terms of facilitating formation of a homogeneous solid electrolyte layer.

The conductive polymer may be attached to the wound body by a method for applying a solution containing, for example, a monomer, a dopant, and an oxidant to the wound body to cause chemical polymerization or electropolymerization on the capacitor element. The conductive polymer may also be attached to the wound body by a method for applying a treatment solution containing the conductive polymer (hereinafter, also simply referred to as a polymer dispersion) to the wound body.

A concentration of the conductive polymer contained in the polymer dispersion preferably ranges from 0.5% by mass to 10% by mass, inclusive. An average particle diameter D50 of the conductive polymer preferably ranges, for example, from 0.01 µm to 0.5 µm, inclusive. Here, the average particle diameter D50 is a median diameter in a volume particle size distribution obtained by a particle size distribution measuring apparatus according to dynamic light scattering.

The polymer dispersion contains a liquid dispersion medium and a conductive polymer dispersed in the liquid dispersion medium. The polymer dispersion may be a solution obtained by dissolving the conductive polymer in the liquid dispersion medium, or a dispersion liquid obtained by dispersing particles of the conductive polymer in the liquid dispersion medium. The wound body that has been impregnated with the treatment solution is normally dried to vaporize at least part of the liquid dispersion medium.

In order to suppress the dedoping in the conductive polymer, an acid may be dissolved in the liquid dispersion medium. Preferable examples of the acid include phthalic acid, benzoic acid, nitrobenzoic acid, salicylic acid, trimellitic acid, and pyromellitic acid.

The polymer dispersion can be obtained by, for example, a method for dispersing the conductive polymer in the liquid dispersion medium or a method for polymerizing a precursor monomer in the liquid dispersion medium and generating particles of the conductive polymer. Preferable examples of the polymer dispersion include poly(3,4-ethylenedioxythiophene) (PEDOT) doped with polystyrenesulfonic acid (PSS). That is, the polymer dispersion preferably contains PEDOT/PSS. Although an antioxidant for the conductive polymer may be added, it is unnecessary to use an antioxidant because PEDOT/PSS little oxidizes.

The liquid dispersion medium may be water, a mixture of water and a nonaqueous solvent, or a nonaqueous solvent. The nonaqueous solvent is not particularly limited, and a protic solvent and an aprotic solvent can be used, for example. Examples of the protic solvent include alcohols such as methanol, ethanol, propanol, butanol, ethylene glycol, and propylene glycol, formaldehyde, and ethers such as 1,4-dioxane. Examples of the aprotic solvent include amides such as N-methylacetamide, N,N-dimethylformamide, and N-methyl-2-pyrrolidone, esters such as methyl acetate, and ketones such as methyl ethyl ketone.

As a method for applying the polymer dispersion to the wound body (impregnating the wound body with the polymer dispersion), for example, a method for immersing the wound body in the polymer dispersion housed in a container is simple and preferable. Further, ultrasonic vibration may be applied to the wound body or the polymer dispersion while the wound body is immersed in the polymer dispersion. The drying of the wound body that has been picked up from the polymer dispersion is preferably performed at, for example, 50° C. to 300° C., inclusive. The step of applying the polymer dispersion to the wound body and the step of drying the wound body may be repeated two or more times. Conducting these steps a plurality of times can increase coverage of the conductive polymer on the wound body.

The steps described above give capacitor element 10 including the conductive polymer attached to a portion between anode foil 21 and cathode foil 22. The conductive polymer formed on the surface of the dielectric layer practically functions as a cathode material.

(v) Step of Impregnating Capacitor Element 10 with Liquid Component

Next, capacitor element 10 is impregnated with a liquid component. This gives an electrolytic capacitor excellent in a repairing function of the dielectric layer. A method for impregnating capacitor element 10 with the liquid component is not particularly limited. For example, a method for immersing capacitor element 10 in the liquid component housed in a container is simple and preferable. The impregnation is preferably performed under a reduced pressure, in an atmosphere ranging, for example, from 10 kPa to 100 kPa, inclusive.

The liquid component may be a nonaqueous solvent or a mixture of a nonaqueous solvent and an ionic substance (a solute such as an organic salt) dissolved in the nonaqueous solvent (that is, an electrolytic solution). The nonaqueous solvent may be an organic solvent or an ionic liquid. The nonaqueous solvent is preferably a high boiling point solvent. As the nonaqueous solvent, there can be used, for example, polyols such as ethylene glycol and propylene glycol, cyclic sulfones such as sulfolane (SL), lactones such as γ-butyrolactone (γBL), amides such as N-methylacetamide, N,N-dimethylformamide, and N-methyl-2-pyrrolidone, esters such as methyl acetate, carbonate compounds such as propylene carbonate (PC), ethers such as 1,4-dioxane, ketones such as methyl ethyl ketone, and formaldehyde. The organic salt is a salt in which at least one of an anion and a cation includes organic matter. Examples of the organic salt to be used include trimethylamine maleate, triethylamine borodisalicylate, ethyldimethylamine phthalate, mono 1,2,3,4-tetramethylimidazolinium phthalate, and mono 1,3-dimethyl-2-ethylimidazolinium phthalate.

(vi) Step of Encapsulating Capacitor Element 10

Next, capacitor element 10 is encapsulated. Specifically, first, capacitor element 10 is housed in bottomed case 11 so that lead wires 14A, 14B are positioned on an open upper surface of bottomed case 11. As a material for bottomed case 11, there can be used metals such as aluminum, stainless steel, copper, iron and brass, or alloys of these metals.

Next, sealing member 12 formed so as to allow lead wires 14A, 14B to penetrate the sealing member is disposed above capacitor element 10 to encapsulate capacitor element 10 in bottomed case 11. Next, bottomed case 11 is, at a part near an opening end, processed by transverse drawing, and is, at the opening end, curled to swage sealing member 12. Then, base plate 13 is disposed on a curled part of the bottomed case to complete the electrolytic capacitor as shown in FIG. 1. Then, an aging treatment may be performed while a rated voltage is applied.

Sealing member 12 is formed of an elastic material containing a rubber component. As the rubber component, there can be used, for example, a butyl rubber (IIR), a nitrile rubber (NBR), an ethylene propylene rubber, an ethylene propylene diene rubber (EPDM), a chloroprene rubber (CR), an isoprene rubber (IR), a Hypalon (trade mark) rubber, a silicone rubber, and a fluorine-containing rubber. Sealing member 12 may contain fillers such as carbon black and silica.

Capacitor element 10 that has been encapsulated may be further subjected to an anodizing treatment to form the first oxide coating film or the dielectric layer. The anodizing treatment at this time can be performed with an electrolytic solution. The anodizing treatment can be performed by, for example, applying a plus voltage to the anode foil or the cathode foil while immersing capacitor element 10 in the electrolytic solution. At this time, a heating treatment is normally performed together. Temperature for the heating treatment ranges, for example, from 100° C. to 150° C., inclusive. The anodizing treatment on the cathode foil after the encapsulation of capacitor element 10 can increase resistance to reverse voltage.

In the exemplary embodiments described above, a wound electrolytic capacitor has been described. The application range of the present disclosure, however, is not limited to the wound electrolytic capacitor and the present disclosure can also be applied to other electrolytic capacitors such as a chip electrolytic capacitor including a metal sintered body as an anode body, and a stacked electrolytic capacitor including a metal plate as an anode body.

EXAMPLES

Hereinafter, the present disclosure is specifically described with reference to an example and a comparative example. The present disclosure, however, is not limited to the example below.

Example 1

In the present example, a wound electrolytic capacitor (diameter 6.3 mm×length 5.8 mm) having a rated voltage of 35 V and a rated electrostatic capacity of 47 μF was produced. Hereinafter, a specific method for manufacturing the electrolytic capacitor is described.
(Preparation of Anode Foil)

An Al foil with a thickness of 120 μm was prepared. The Al foil was subjected to direct current etching to roughen a surface of the Al foil. Next, the Al foil was subjected to a chemical conversion treatment to form a dielectric layer (thickness: about 70 nm) and thus give an anode foil. The dielectric layer was formed by performing the chemical conversion treatment at 70° C. for 30 minutes while applying a voltage of 50 V to the Al foil with the Al foil immersed in an ammonium adipate solution. Then, the anode foil was cut into a predetermined size to prepare an anode foil.
(Preparation of Cathode Foil)

An aluminum foil with a thickness of 50 μm was subjected to etching to roughen a surface of the aluminum foil.

Next, the aluminum foil was subjected to an anodizing treatment to form oxide coating films (mainly a second oxide coating film). The oxide coating films were formed by performing the anodizing treatment at 70° C. for 30 minutes while applying a voltage of 3 V to the aluminum foil with the aluminum foil immersed in an ammonium adipate solution. Then, the aluminum foil was cut to prepare a cathode foil.
(Production of Wound Body)

An anode lead tab and a cathode lead tab to each of which a lead wire was connected were connected to the anode foil and the cathode foil, respectively. Then, the anode foil and the cathode foil were wound with a separator interposed between the anode foil and the cathode foil while the lead tabs were rolled in the anode foil, the cathode foil, and the separator, and an outer surface was fixed with a fastening tape to produce a wound body.

A dielectric layer was formed on an end surface of the anode foil by performing a re-anodizing treatment at 70° C. for 60 minutes while applying a voltage of 50 V to the anode foil with the produced wound body immersed in an ammonium adipate solution.

Next, a first oxide coating film was formed on an end surface of the cathode foil by applying a voltage of 3 V to the cathode foil while immersing the wound body in an ammonium adipate aqueous solution. The first oxide coating film had a thickness of 3 nm, and the second oxide coating film formed on the main surface of the cathode foil had a thickness of 5 nm.
(Preparation of Polymer Dispersion)

A mixed solution was prepared by dissolving 3,4-ethylenedioxythiophene and a dopant, or polystyrenesulfonic acid in ion-exchanged water. While the resultant mixed solution was stirred, iron (III) sulfate (oxidant) that had been dissolved in ion-exchanged water was added to the mixed solution to cause a polymerization reaction. After the reaction, the resultant reaction solution was dialyzed to remove unreacted monomers and an excessive oxidant, so that a polymer dispersion that contained about 5% by mass of polyethylene dioxythiophene doped with polystyrenesulfonic acid was prepared.
(Production of Capacitor Element)

The wound body was immersed in the polymer dispersion housed in a predetermined container in a reduced-pressure atmosphere (40 kPa) for 5 minutes, and then the wound body was picked up from the polymer dispersion. Next, the wound body that had been impregnated with the polymer dispersion was dried in a drying furnace at 150° C. for 20 minutes to attach the conductive polymer to a portion between the anode foil and the cathode foil of the wound body. Thus, a capacitor element was completed.
(Impregnation with Electrolytic Solution)

The capacitor element was impregnated with an electrolytic solution in a reduced-pressure atmosphere (40 kPa). Used as the electrolytic solution was a solution containing PEG (polyethylene glycol), γBL, SL, and mono(ethyldimethylamine) phthalate (solute) at a mass ratio of 25:25:25:25.
(Encapsulation of Capacitor Element)

The capacitor element that had been impregnated with the electrolytic solution was encapsulated to complete an electrolytic capacitor. Then, an aging treatment was performed at 130° C. for 2 hours while the rated voltage was applied.

The obtained electrolytic capacitor was measured by a following procedure to obtain electrostatic capacity and an ESR value. The electrostatic capacity (initial electrostatic capacity) (μF) at a frequency of 120 Hz was measured for the electrolytic capacitor using an LCR meter for 4-terminal measurement. The ESR value (initial ESR value) (mΩ) at a frequency of 100 kHz was measured for the electrolytic capacitor using an LCR meter for 4-terminal measurement.

The electrostatic capacity and the ESR value were each measured for randomly selected 120 electrolytic capacitors, and average values for the electrostatic capacity and the ESR value were calculated.

Comparative Example 1

The conductive polymer dispersion was applied to the wound body after the formation of the dielectric layer on the end surface of the anode foil without the formation of the first oxide coating film on the end surface of the cathode foil. An electrolytic capacitor was produced in the same manner as in Example 1 except for the above-described operation, and the electrolytic capacitor was evaluated.

Table 1 shows results of the example and the comparative example. A1 denotes Examples 1 and B1 denotes Comparative Example 1.

TABLE 1

|    | Initial electrostatic capacity (μF) | ESR value (mΩ) |
|----|-------------------------------------|----------------|
| A1 | 46.3                                | 21.5           |
| B1 | 41.2                                | 27.8           |

As shown in Table 1, the electrolytic capacitor of the example that included the first oxide coating film formed on the end surface of the cathode foil had a lower ESR and a higher capacitance than the ESR and the capacitance of the electrolytic capacitor of the comparative example that included no first oxide coating film.

The present disclosure can be utilized in a so-called hybrid electrolytic capacitor that includes a conductive polymer attached to a portion between an anode foil and a cathode foil, and a liquid component such as an electrolytic solution.

What is claimed is:

1. An electrolytic capacitor comprising:
    a wound body including a cathode foil and an anode foil having a dielectric layer on a main surface of the anode foil, the cathode foil and the anode foil being laminated and wound so that a main surface of the cathode foil faces the main surface of the anode foil;
    a conductive polymer disposed between the cathode foil and the anode foil to cover at least part of the dielectric layer; and
    a liquid component in contact with the conductive polymer,
    wherein the cathode foil includes a first oxide coating film on an end surface of the cathode foil, the end surface of the cathode foil being a surface other than the main surface of the cathode foil and existing at an end of the cathode foil.

2. The electrolytic capacitor according to claim 1, wherein:
    the cathode foil includes a second oxide coating film on the main surface of the cathode foil, and
    a thickness of the first oxide coating film is smaller than a thickness of the second oxide coating film.

3. A method for manufacturing an electrolytic capacitor including a cathode foil having a first oxide coating film on an end surface of the cathode foil and a second oxide coating film on a main surface of the cathode foil, the method comprising:
    forming an oxide coating film on a main surface of a metal foil;
    cutting the metal foil to form the cathode foil having the second oxide coating film and a cutting surface at an end of the cathode foil;
    forming a wound body, the wound body including the cathode foil, an anode foil having a dielectric layer on a main surface of the anode foil, and a separator disposed between the cathode foil and the anode foil;
    attaching a conductive polymer to the wound body so as to cover at least part of the dielectric layer to form a capacitor element, the conductive polymer being disposed between the cathode foil and the anode foil;
    impregnating the capacitor element with a liquid component; and
    forming the first oxide coating film on an end the cutting surface of the cathode foil before the attaching of the conductive polymer to the wound body.

* * * * *